United States Patent
Feng

(10) Patent No.: US 12,323,707 B2
(45) Date of Patent: Jun. 3, 2025

(54) COMMUNICATION CIRCUIT WITH OPTICAL IMAGE STABILIZATION, CONTROL METHOD AND APPARATUS FOR COMMUNICATION CIRCUIT, AND ELECTRONIC DEVICE

(71) Applicant: VIVO MOBILE COMMUNICATION CO., LTD., Guangdong (CN)

(72) Inventor: Shuai Feng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 206 days.

(21) Appl. No.: 18/115,659

(22) Filed: Feb. 28, 2023

(65) Prior Publication Data

US 2023/0209189 A1    Jun. 29, 2023

Related U.S. Application Data

(63) Continuation of application No. PCT/CN2021/115873, filed on Sep. 1, 2021.

(30) Foreign Application Priority Data

Sep. 2, 2020    (CN) .......................... 202010909195.7

(51) Int. Cl.
H04N 23/68    (2023.01)
(52) U.S. Cl.
CPC ....... *H04N 23/687* (2023.01); *H04N 23/6812* (2023.01)
(58) Field of Classification Search
CPC . H04N 23/687; H04N 23/6812; H04N 23/685
See application file for complete search history.

(56) References Cited

U.S. PATENT DOCUMENTS

| | | | |
|---|---|---|---|
| 2013/0050536 | A1 | 2/2013 | Suzuki et al. |
| 2016/0165137 | A1 | 6/2016 | Kang |
| 2017/0374286 | A1 | 12/2017 | Watanabe |
| 2019/0253629 | A1 | 8/2019 | Kim et al. |

(Continued)

FOREIGN PATENT DOCUMENTS

| | | |
|---|---|---|
| CN | 106131395 A | 11/2016 |
| CN | 109951639 A | 6/2019 |
| CN | 110012224 A | 7/2019 |

(Continued)

OTHER PUBLICATIONS

CN Office Action dated Jul. 14, 2021 as received in Application No. 202010909195.7.

(Continued)

*Primary Examiner* — Nicholas G Giles
(74) *Attorney, Agent, or Firm* — Price Heneveld LLP

(57) ABSTRACT

This application discloses a communication circuit, a control method, and an electronic device. The circuit includes a plurality of optical image stabilizers OIS, a gyroscope, and a control circuit, where an input terminal of the control circuit is connected to a power terminal, an output terminal of the control circuit is connected to the plurality of OISs separately, and the plurality of OISs are all connected to the gyroscope; and the control circuit controls one of the plurality of OISs to conductively connect to the gyroscope and establish a communication connection.

19 Claims, 5 Drawing Sheets

(56) References Cited

U.S. PATENT DOCUMENTS

2020/0120279 A1\* 4/2020 Min .................. H04N 23/6812

FOREIGN PATENT DOCUMENTS

| CN | 111031235 A | 4/2020 |
| --- | --- | --- |
| CN | 111050035 A | 4/2020 |
| CN | 111371997 A | 7/2020 |
| CN | 112188084 A | 1/2021 |
| JP | 2007033624 A | 2/2007 |
| JP | 2016178430 A | 10/2016 |
| KR | 10-2019-0097786 A | 8/2019 |
| KR | 20200041544 A | 4/2020 |

OTHER PUBLICATIONS

International Search Report and Written Opinion of the International Searching Authority dated Dec. 8, 2021 as received in Application No. PCT/CN2021/115873.
Office Action from Japanese Application No. 2023-513892 issued Jan. 19, 2024.

\* cited by examiner

COMMUNICATION CIRCUIT WITH OPTICAL IMAGE STABILIZATION, CONTROL METHOD AND APPARATUS FOR COMMUNICATION CIRCUIT, AND ELECTRONIC DEVICE

CROSS-REFERENCE TO RELATED APPLICATIONS

The present invention is a continuation application of PCT International Application No. PCT/CN2021/115873 filed on Sep. 1, 2021, which claims priority to Chinese Patent Application No. 202010909195.7, filed with the China National Intellectual Property Administration on Sep. 2, 2020 and entitled "COMMUNICATION CIRCUIT, CONTROL METHOD AND APPARATUS, AND ELECTRONIC DEVICE". All the disclosures are incorporated herein by reference in their entireties.

TECHNICAL FIELD

This application relates to the field of communication technologies, and specifically, to a communication circuit, a control method and apparatus, and an electronic device.

BACKGROUND

An OIS (Optical Image Stabilization) is a component that improves the imaging resolution of a camera or other similar imaging instruments. It works in a principle that a gyroscope in a lens detects a slight movement, and then transmits a signal to a microprocessor, and that a processor immediately calculates a displacement to be compensated for, and then performs compensation based on a shaking direction of the lens and the displacement by using a compensation lens group, thereby effectively resolving image blur caused by vibration of the camera.

In an OIS system, an SPI (Serial Peripheral Interface) is generally used for communication, an OIS serves as a master device of the SPI, and a gyroscope serves as a slave device of the SPI. An SPI protocol is for a single host system, to be specific, one gyroscope can serve only one OIS at a time. The gyroscope can work normally when the camera has only one OIS. Due to increasingly high user requirements for camera shooting using mobile phones, more than one OIS cameras are usually provided for existing mobile phones.

However, when the camera of the mobile phone has two OISs, if the two OISs access the gyroscope through one SPI interface at the same time, the SPI cannot work normally, resulting in exceptions of the system.

SUMMARY

Embodiments of this application provide a communication circuit, a control method and apparatus, and an electronic device, so as to resolve the problem of exceptions of a system caused by abnormal working of an SPI due to a plurality of OISs accessing a gyroscope through one SPI interface at the same time.

To resolve the foregoing technical problem, this application is implemented as follows.

According to a first aspect, a communication circuit is provided and includes a plurality of optical image stabilizers OIS, a gyroscope, and a control circuit; where an input terminal of the control circuit is connected to a power terminal, an output terminal of the control circuit is connected to the plurality of OISs separately, and the plurality of OISs are all connected to the gyroscope; and the control circuit controls one of the plurality of OISs to conductively connect to the gyroscope and establish a communication connection.

According to a second aspect, a control method is provided and applied to the communication circuit according to the first aspect. The method includes:

controlling, using a control circuit, any one of a plurality of OISs to be conductively connected; and in a case that any one of the plurality of OISs is conductively connected, obtaining, using the OIS conductively connected, data detected by a gyroscope to adjust a direction of an optical assembly.

According to a third aspect, a control apparatus is provided and includes:

a monitoring module, configured to monitor states of a plurality of optical image stabilizers OIS; and a control module, configured to, in a case that only one target OIS in the plurality of OISs is in a working state, control the target OIS to communicate with a gyroscope.

According to a fourth aspect, an electronic device is provided. The electronic device includes the communication circuit according to the first aspect.

According to a fifth aspect, an electronic device is provided. The electronic device includes a processor, a memory, and a program or instructions stored in the memory and capable of running on the processor, where when the program or instructions are executed by the processor, the steps of the method according to the second aspect are implemented.

According to a sixth aspect, a readable storage medium is provided. The readable storage medium stores a program or instructions, and when the program or instructions are executed by a processor, the steps of the method according to the second aspect are implemented.

According to a seventh aspect, an embodiment of this application provides a chip. The chip includes a processor and a communication interface, where the communication interface is coupled to the processor, and the processor is configured to run a program or instructions to implement the method according to the second aspect.

In the embodiments of this application, a communication circuit may include a plurality of optical image stabilizers OIS, a gyroscope, and a control circuit; where an input terminal of the control circuit is connected to a power terminal, an output terminal is connected to the plurality of OISs separately, and the plurality of OISs are all connected to the gyroscope; and the control circuit controls one of the plurality of OISs to conductively connect to the gyroscope and establish a communication connection. In this application, the plurality of OISs are all connected to one gyroscope, and then the control circuit controls one of the plurality of OISs to conductively connect to the gyroscope to obtain data detected by the gyroscope, such that when the plurality of OISs are connected to one gyroscope, only an OIS in a working state communicates with the gyroscope. In this case, no collision caused by the plurality of OISs being all conductively connected to the gyroscope occurs, and using only one gyroscope can reduce costs of the entire equipment.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

Figure 1:
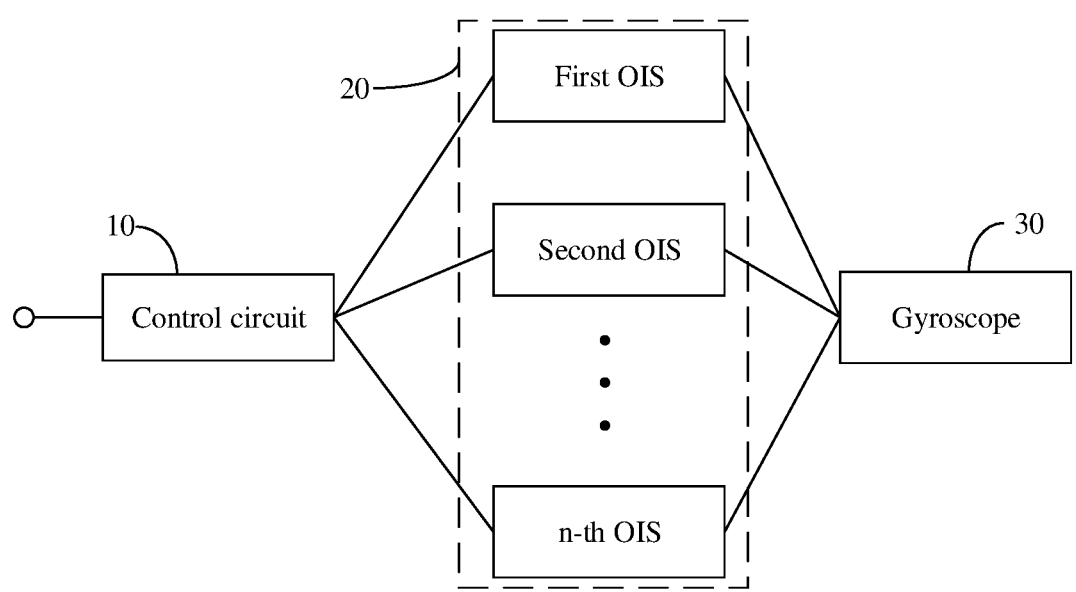
FIG. 1 is a structural block diagram of a communication circuit according to an embodiment of this application.

In the drawings, 10. control circuit; 20. a plurality of OISs; and 30. gyroscope.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, in this specification and claims, "and/or" indicates at least one of connected objects, and the character "I" generally indicates an "or" relationship between associated objects.

The following describes in detail a communication circuit provided in the embodiments of this application through specific embodiments and application scenarios thereof with reference to the accompanying drawings.

As shown in FIG. 1, the communication circuit may include a plurality of optical image stabilizers OIS, a gyroscope 30, and a control circuit 10.

Specifically, an input terminal of the control circuit 10 is connected to a power terminal, an output terminal of the control circuit 10 is connected to the plurality of OISs 20 separately, and the plurality of OISs 20 are all connected to the gyroscope 30; and the control circuit 10 controls one of the plurality of OISs 20 to conductively connect to the gyroscope 30 and establish a communication connection.

A quantity of the OISs is n, where n is a positive integer.

To be specific, one of the plurality of OISs 20 is controlled using an electrical signal input through the input terminal of the control circuit 10, to be in a working state, that is, to conductively connect to the gyroscope 30 and establish a communication connection, such that exceptions of a system caused by two or more OISs communicating with the gyroscope 30 at the same time can be avoided.

In this embodiment of this application, a communication circuit may include a plurality of optical image stabilizers OIS, a gyroscope 30, and a control circuit 10; where an input terminal of the control circuit 10 is connected to a power terminal, an output terminal is connected to the plurality of OISs 20 separately, and the plurality of OISs 20 are all connected to the gyroscope 30; and the control circuit 10 controls one of the plurality of OISs 20 to conductively connect to the gyroscope 30 and establish a communication connection. In this application, the plurality of OISs 20 are all connected to one gyroscope 30, and then the control circuit 10 controls one of the plurality of OISs 20 to conductively connect to the gyroscope 30 to obtain data detected by the gyroscope 30, such that when the plurality of OISs 20 are connected to one gyroscope 30, only an OIS in a working state communicates with the gyroscope 30. In this case, no collision caused by the plurality of OISs 20 all communicating with the gyroscope 30 occurs, and using only one gyroscope 30 can reduce costs of the entire equipment.

In this embodiment of this application, the control circuit 10 can control the plurality of OISs 20 to be conductively connected at different times, and only one OIS is conductively connected at a time. In this case, because one gyroscope 30 can serve only one OIS at a time, abnormal working of an SPI can be avoided if two or more OISs access the gyroscope 30 through one SPI interface at the same time.

Figure 2:
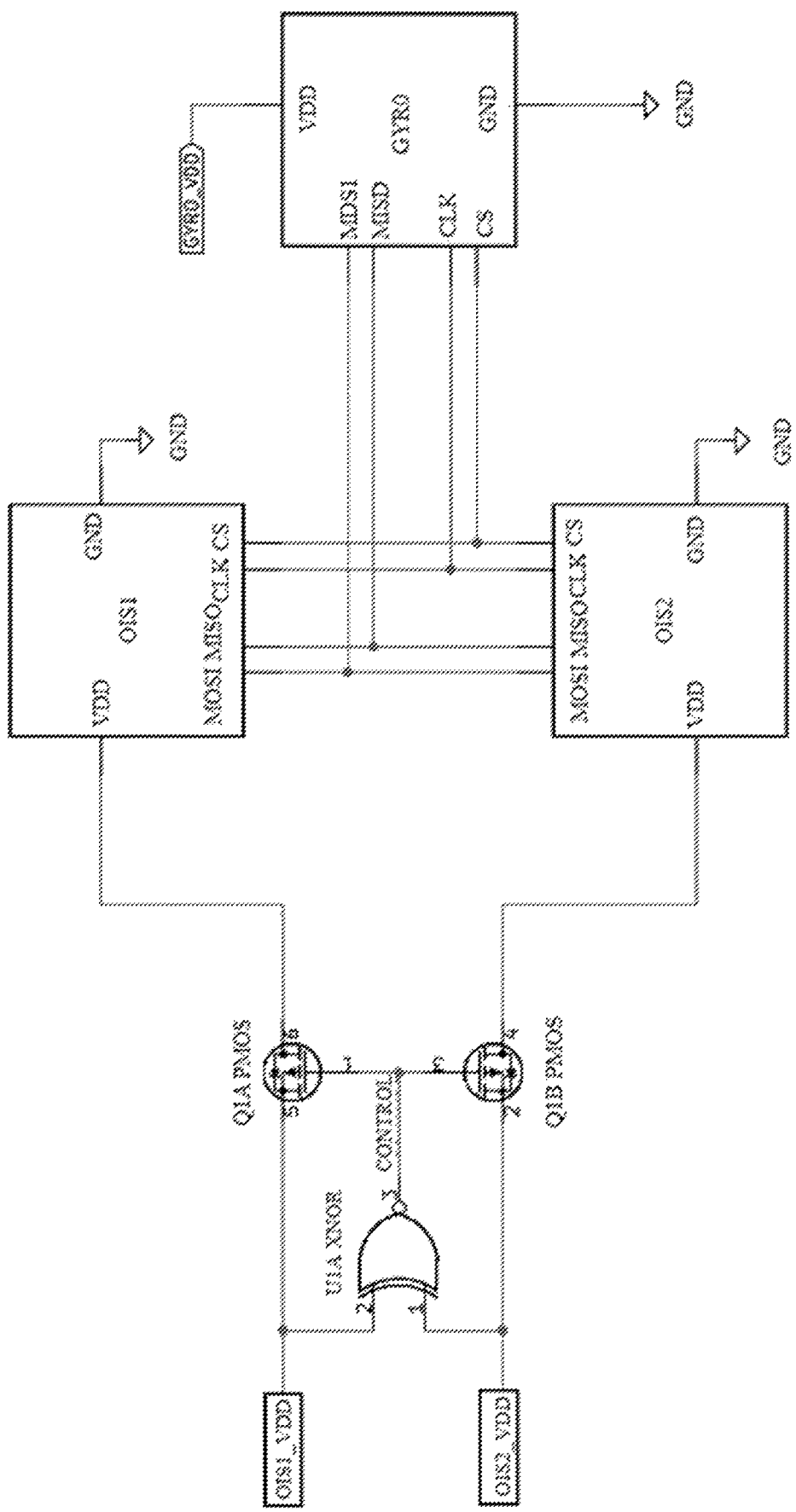
FIG. 2 is a schematic circuit diagram of a communication circuit according to an embodiment of this application.

As shown in FIG. 2, in a possible implementation of this application, two OISs are used as an example, that is, the plurality of OISs 20 include a first OIS and a second OIS. The control circuit 10 may include an exclusive NOR gate, a first MOS field effect transistor, and a second MOS field effect transistor.

Specifically, a first input terminal of the exclusive NOR gate is connected to a first power terminal and a source of the first MOS field effect transistor separately, a second input terminal of the exclusive NOR gate is connected to a second power terminal and a source of the second MOS field effect transistor separately, and an output terminal of the exclusive NOR gate is connected to a gate of the first MOS field effect transistor and a gate of the second MOS field effect transistor separately; a drain of the first MOS field effect transistor is connected to a power input terminal of the first OIS; a drain of the second MOS field effect transistor is connected to a power input terminal of the second OIS; and the first OIS or the second OIS is controlled using an electrical signal input through two power terminals of the exclusive NOR gate, to conductively connect to the gyroscope 30.

In this embodiment of this application, hardware structures, namely, the exclusive NOR gate and the MOS field effect transistors, are used to control the OIS to conductively connect to the gyroscope 30, such that the plurality of OISs 20 cannot access one gyroscope 30 at the same time, avoiding abnormal working of an SPI. The hardware structures are low-cost components, and using such structure can reduce costs of the entire equipment.

The MOS field effect transistor is a metal-oxide-semiconductor field effect transistor, and is used as a switch in all of the embodiments of this application. The MOS field effect transistor in this application uses a PMOS transistor.

In FIG. 2, OIS1 and O1S2 are SPI interfaces of the two OISs, and other pins of the OISs are not drawn; and GYRO shows an SPI interface of the gyroscope 30, and other parts of the gyroscope 30 are not drawn.

Power supplies of the two OISs are connected to the input terminals of the exclusive NOR (XNOR) gate, and the logic thereof is as follows.

When only one of the two OISs is powered on, for example, only a first power terminal OIS1_VDD is powered on, an output terminal CONTROL of the exclusive NOR gate outputs a low level to conductively connect a first MOS field effect transistor Q1A and a second MOS field effect transistor Q1B, and OIS1 of the first OIS works normally. Although Q1B is also conductively connected, O1S2 of the second OIS does not work because a second power terminal OIS2_VDD is not powered on. OIS1 can exclusively occupy the gyroscope 30 GYRO with no collision, and work normally. Similarly, when only OIS2_VDD is powered on, O1S2 can also work normally.

In this embodiment of this application, the two OISs can be prevented from being conductively connected to the gyroscope 30 at the same time. In other words, when the software is abnormal and the two OISs are powered on at the same time, the exclusive NOR gate outputs a high level, so as to turn off the two MOS field effect transistors, which can prevent the OISs from being conductively connected. Therefore, the OISs have good robustness.

Specifically, when the two OISs are powered on at the same time, in other words, in a case that the software is abnormal, that is, OIS1_VDD and OIS2_VDD are both high, CONTROL outputs a high level, both Q1A and Q1B are turned off, and neither OIS1 nor O1S2 can work normally. The software becomes aware of abnormality in the software when being unable to control the OISs. No error data is produced in the whole process.

In this embodiment of this application, the control circuit 10 controls a plurality of OISs 20 and one gyroscope 30, which can avoid that a plurality of OISs 20 need correspond to a plurality of gyroscopes 30 in some embodiments, reduce a quantity of the gyroscopes 30 for cost reduction, and achieve the purpose of a plurality of OISs 20 accessing one gyroscope 30.

Figure 3:
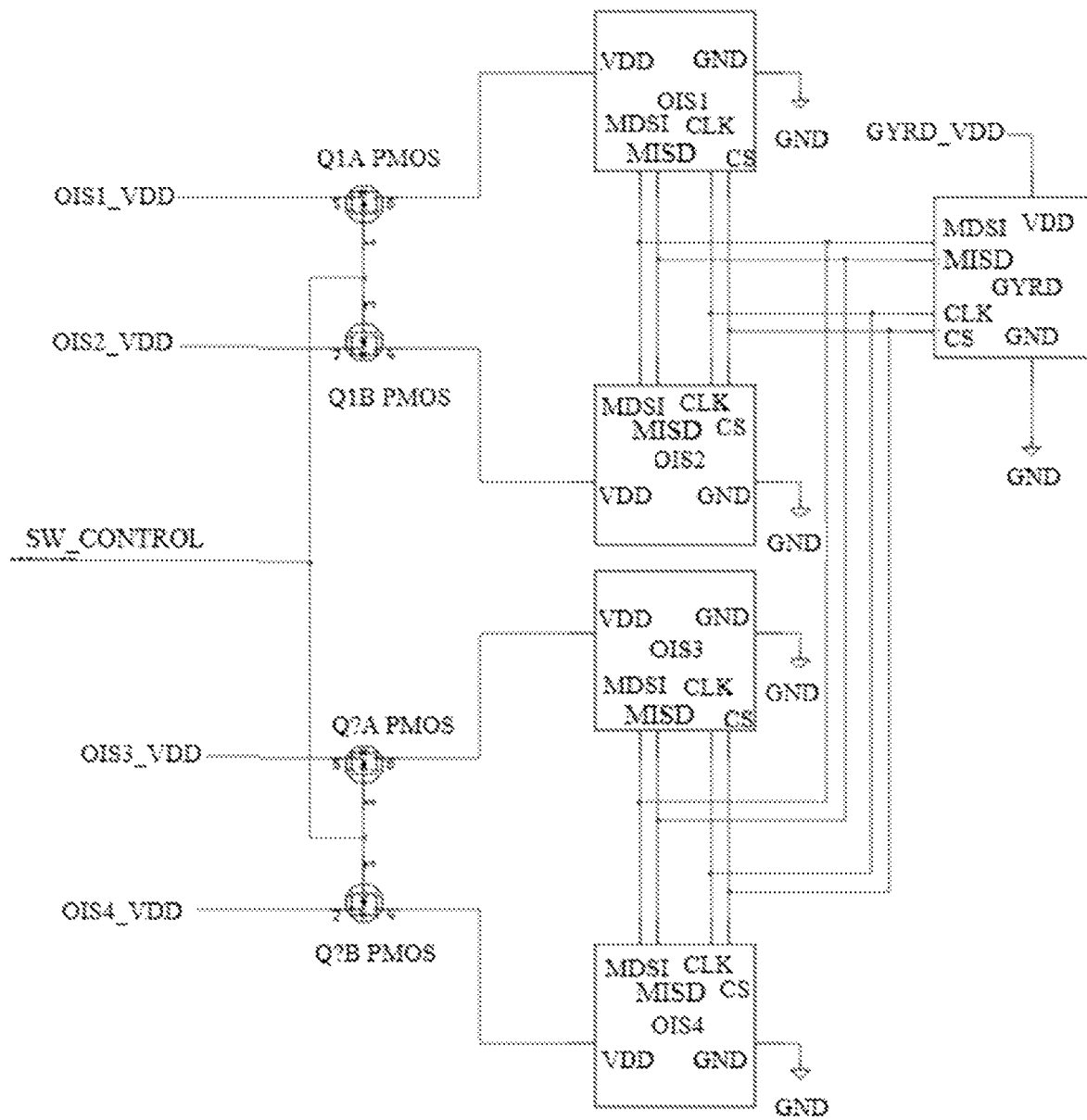
FIG. 3 is a schematic circuit diagram of another communication circuit according to an embodiment of this application.

As shown in FIG. 3, in a possible implementation of this application, a plurality of OISs 20 are used as an example. Four OISs are used as an example in FIG. 3. The control circuit 10 may include a first control terminal and a plurality of MOS field effect transistors.

Specifically, the first control terminal is connected to gates of the plurality of MOS field effect transistors; sources of the plurality of MOS field effect transistors are all connected to their corresponding power terminals, and drains of the plurality of MOS field effect transistors are all connected to their corresponding power input terminals of the OISs; and one of the plurality of OISs 20 is controlled using an electrical signal input through the plurality of power terminals and the first control terminal, to conductively connect to the gyroscope 30.

In this embodiment of this application, the OIS may be controlled using software and hardware to conductively connect to the gyroscope 30, that is, the OIS is controlled using a software control signal SW_CONTROL to conductively connect to the gyroscope 30, and the control logic thereof is as follows. N is a quantity of the OISs powered on.
if (N=1):

SW_CONTROL=low else:

SW_CONTROL=high

In other words, in a case that only one OIS is powered on, SW_CONTROL outputs a low level, all switches are turned on, and the one OIS powered on starts to work. In a case that no OIS is powered on, that is, zero OIS is powered on, SW_CONTROL outputs a high level, and all switches are turned off. In a case that the plurality of OISs 20 are powered on, in other words, the OISs work abnormally, SW_CONTROL also outputs a high level to isolate the plurality of power supplies powered on at the same time from the OISs and prohibit the OISs from working, so as to prevent the plurality of OISs 20 from communicating with the gyroscope 30 at the same time to avoid collision in the SPI and exceptions in the system. In other words, when only one OIS is powered on, the software lowers SW_CONTROL, all PMOSs are conductively connected, and the only OIS powered on normally communicates with the gyroscope 30.

In this embodiment of this application, a hardware circuit becomes complex as a quantity of the OISs increases. Therefore, when there are a large quantity of OISs, the OISs are controlled using software and hardware, to conductively connect to the gyroscope 30.

Figure 4:
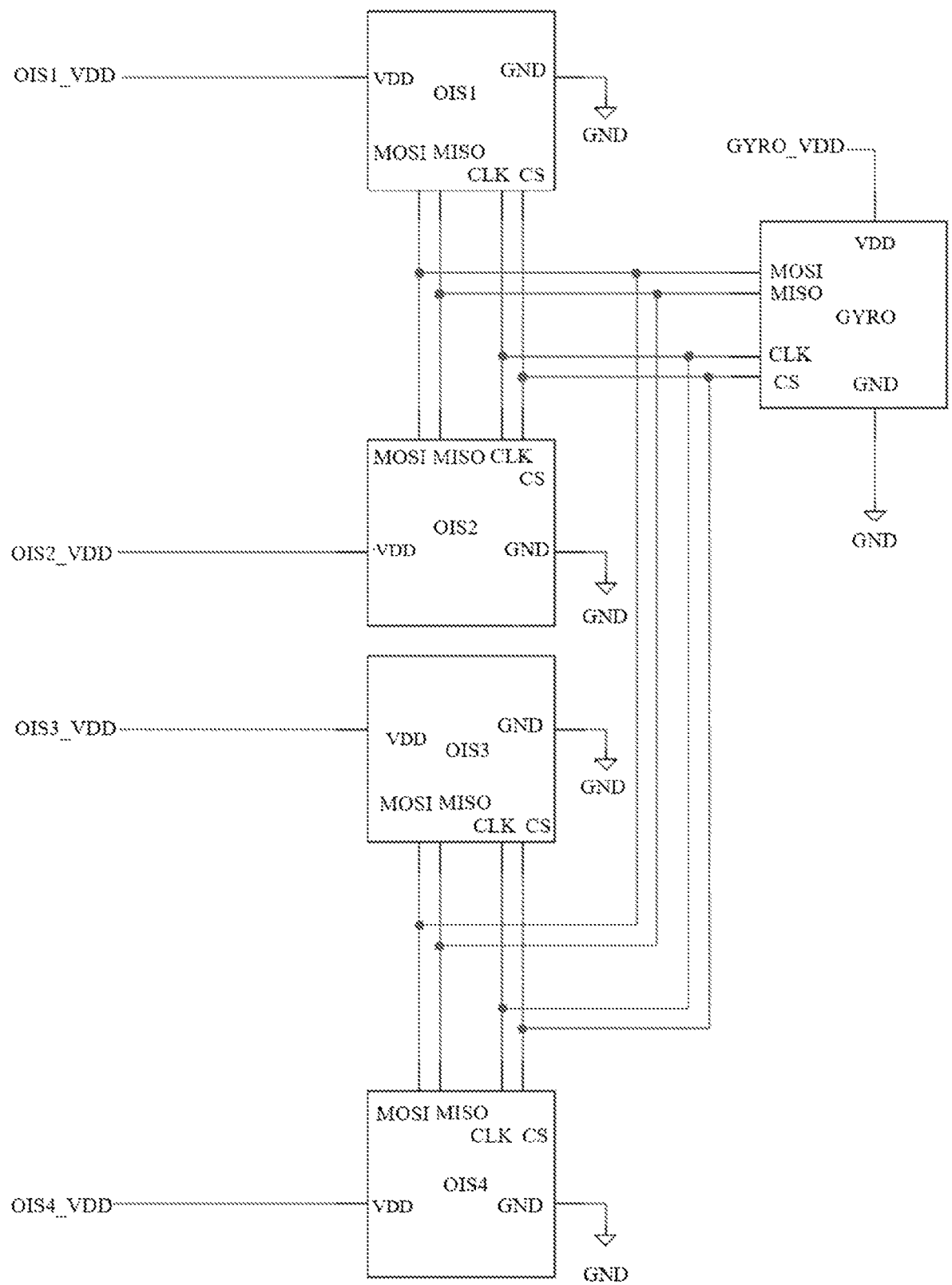
FIG. 4 is a schematic circuit diagram of still another communication circuit according to an embodiment of this application.

As shown in FIG. 4, in a possible implementation of this application, a plurality of OISs 20 are used as an example. Four OISs are used as an example in FIG. 4. The control circuit 10 is a processor. Specifically, the control circuit 10 may include a plurality of control terminals connected to power input terminals of the plurality of OISs 20 respectively, and one of the plurality of OISs 20 is controlled using an electrical signal input through the plurality of control terminals, to conductively connect to the gyroscope 30.

In this embodiment of this application, the OIS is controlled using software to conductively connect to the gyroscope 30, which prevents the plurality of OISs 20 from working at the same time, thereby avoiding multi-host collision in the SPI.

The determining logic of software controlling the OIS is as follows.
if (N is not equal to 1):

Exception found, stop working of OIS else:

OIS can be powered on normally to work

In other words, when the plurality of OISs 20 are conductively connected to the gyroscope 30, working of all the OISs is stopped, such that collision can be avoided when the plurality of OISs 20 are directly connected to one gyroscope 30.

In a possible implementation of this application, the plurality of OISs 20 each include an SPI interface, the gyroscope 30 includes an SPI interface, and the SPI interfaces of the plurality of OISs 20 are all connected to the SPI interface of the gyroscope 30, where the OIS conductively connected obtains, through a corresponding SPI interface, data detected by the gyroscope 30.

In this embodiment of this application, the OIS is connected to the gyroscope 30 through the SPI interface. The gyroscope 30 is directly connected to the OIS, such that the gyroscope 30 can quickly send data to the OIS when detecting the data, so as to adjust an optical assembly, which can make the adjustment quicker and improve sensitivity of the optical assembly.

Figure 5:
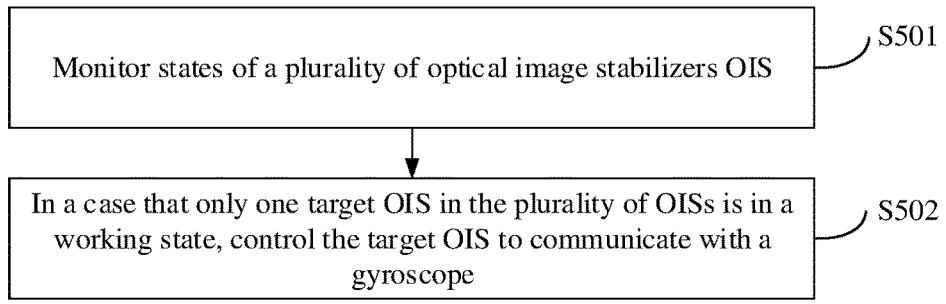
FIG. 5 is a flowchart of a control method according to an embodiment of this application.

An embodiment of this application further provides a control method. The method is applied to the communication circuit according to any one of the foregoing embodiments. As shown in FIG. 5, the control method may include step S501 and step S502.

In step S501, monitoring is performed on states of a plurality of optical image stabilizers OIS.

In step S502, in a case that only one target OIS in the plurality of OISs 20 is in a working state, the target OIS is controlled to communicate with a gyroscope.

In this embodiment of this application, the states of the plurality of OISs 20 are detected, and in a case that only one target OIS in the plurality of OISs 20 is in a working state, the target OIS is controlled to communicate with the gyroscope. In this case, no collision occurs when the plurality of OISs 20 are connected to one gyroscope, and using only one gyroscope can reduce costs of the entire equipment.

In a possible implementation of this application, the only one target OIS in the plurality of OISs 20 being in a working state may include the following step.

The target OIS in the plurality of OISs 20 is determined by determining a state of a control circuit connected to the plurality of OISs 20.

In this embodiment of this application, the control circuit is configured to control the OIS to conductively connect to the gyroscope, such that the target OIS can be determined quickly by determining the state of the control circuit.

In a possible implementation of this application, the plurality of OISs 20 include a first OIS and a second OIS, the control circuit may include an exclusive NOR gate, a first MOS field effect transistor, and a second MOS field effect transistor, and correspondingly, the determining the target OIS in the plurality of OISs 20 by determining a state of a control circuit connected to the plurality of OISs 20 may include the following step.

The first MOS field effect transistor and/or the second MOS field effect transistor connected to the exclusive NOR gate is controlled using a power terminal of the exclusive NOR gate, to be conductively connected.

In a case that the first MOS field effect transistor is conductively connected, the first MOS field effect transistor is conductively connected to the first OIS, and the first OIS is the target OIS; and in a case that the second MOS field effect transistor is conductively connected, the second MOS field effect transistor is conductively connected to the second OIS, and the second OIS is the target OIS.

In other words, the first MOS field effect transistor and/or the second MOS field effect transistor connected to the exclusive NOR gate is controlled using the power terminal of the exclusive NOR gate, to be conductively connected. When only a first power terminal is a high level and a second power terminal is a low level, the first MOS field effect transistor is conductively connected to the exclusive NOR gate, such that the first OIS is the target OIS, and the first OIS is conductively connected to the gyroscope. Correspondingly, when only the second power terminal is a high level, the second OIS is conductively connected to the exclusive NOR gate, such that the second OIS is the target OIS, and the second OIS is conductively connected to the gyroscope.

In this embodiment of this application, the OIS is controlled using hardware structures, namely, the exclusive NOR gate and the MOS field effect transistors, to be conductively connected, such that the plurality of OISs 20 cannot access one gyroscope at the same time, avoiding abnormal working of an SPI. The hardware structures are low-cost components, and using such structure can reduce costs of the entire equipment. In addition, the two OISs can be prevented from being conductively connected to the gyroscope at the same time. In other words, when the software is abnormal and the two OISs are powered on at the same time, the exclusive NOR gate outputs a high level, so as to turn off the two MOS field effect transistors, which can prevent the OISs from being conductively connected. Therefore, the OISs have good robustness.

In a possible implementation of this application, the control circuit may include a first control terminal and a plurality of MOS field effect transistors, and correspondingly, the determining the target OIS in the plurality of OISs 20 by determining a state of a control circuit connected to the plurality of OISs 20 may include the following step.

One of the plurality of MOS field effect transistors is controlled using the plurality of power terminals and the first control terminal, to be conductively connected.

In a case that one of the plurality of MOS field effect transistors is conductively connected, the MOS field effect transistor conductively connected is conductively connected to an OIS connected to the MOS field effect transistor, and the OIS conductively connected is the target OIS.

In other words, the OIS may be controlled using software and hardware, to conductively connect to the gyroscope. Specifically, when only one OIS is powered on, the first control terminal inputs a low level, all the MOS field effect transistors are conductively connected, and the OIS powered on is connected to the gyroscope. When the plurality of OISs 20 are powered on, that is, the OISs work abnormally, the first control terminal inputs a high level, all the MOS field effect transistors are turned off, and working of the OISs is disabled, preventing the plurality of OISs 20 from communicating with the gyroscope at the same time, thereby preventing collision from being occurred in the SPI and avoiding exceptions of the system.

In this embodiment of this application, because a hardware circuit becomes complicated as a quantity of the OISs increases, when there are a large quantity of OISs, the OISs are controlled using software and hardware, to be conductively connected.

In a possible implementation of this application, the control circuit is a processor, and correspondingly, the determining the target OIS in the plurality of OISs 20 by determining a state of a control circuit connected to the plurality of OISs 20 may further include the following step.

One of the plurality of OISs 20 is sequentially controlled, according to a preset sequence using a plurality of control terminals of the processor, to be the target OIS.

In other words, one of the plurality of OISs 20 may be controlled using software, to conductively connect to the gyroscope, and the plurality of OISs 20 may be controlled, according to the preset sequence using the software, to work at different times.

Specifically, according to the sequence, in the first power-on, the first OIS is powered on and conductively connected, to be connected to the gyroscope; in the second power-on, the second OIS is powered on and conductively connected, to be connected to the gyroscope; and so on. This can avoid collision occurred in the SPI caused by the plurality of OISs 20 being all connected to the gyroscope. In addition, no hardware component needs to be added, and therefore low costs are required.

Further, a corresponding OIS may be selected based on a zoom multiple supported by the OIS.

In this embodiment of this application, the plurality of OISs 20 may be controlled using the software, to work at different times, avoiding collision occurred in the SPI.

In a possible implementation of this application, the control method may further include: in a case that two or more of the plurality of OISs 20 are detected to be in a working state, determining that the communication circuit is abnormal.

In other words, in this embodiment of this application, the plurality of OISs 20 can be prevented from working at the same time. When the circuit is abnormal, working of all the OISs can be stopped, avoiding collision occurred in the SPI.

Optionally, an embodiment of this application further provides a control apparatus including a monitoring module and a control module.

Specifically, the monitoring module is configured to monitor states of a plurality of optical image stabilizers OIS; and the control module is configured to, in a case that only one target OIS in the plurality of OISs 20 is in a working state, control the target OIS to communicate with a gyroscope.

In this embodiment of this application, the states of the plurality of OISs 20 are detected using the monitoring module, and in a case that only one target OIS in the plurality of OISs 20 is in a working state, the target OIS is controlled using the control module, to communicate with the gyroscope. In this case, no collision occurs when the plurality of OISs 20 are connected to one gyroscope, and using only one gyroscope can reduce costs of the entire equipment.

In a possible implementation of this application, the control module is configured to determine the target OIS in the plurality of OISs 20 by determining a state of a control circuit connected to the plurality of OISs 20.

In a possible implementation of this application, the plurality of OISs 20 include a first OIS and a second OIS, the control circuit includes an exclusive NOR gate, a first MOS field effect transistor, and a second MOS field effect transistor, and the control module is configured to control, using a power terminal of the exclusive NOR gate, the first MOS field effect transistor and/or the second MOS field effect transistor connected to the exclusive NOR gate to be conductively connected, where in a case that the first MOS field effect transistor is conductively connected, the first MOS field effect transistor is conductively connected to the first OIS, and the first OIS is the target OIS; and in a case that the second MOS field effect transistor is conductively connected, the second MOS field effect transistor is conductively connected to the second OIS, and the second OIS is the target OIS.

In a possible implementation of this application, the control circuit is a processor, and the control module is configured to sequentially control, according to a preset sequence using a plurality of control terminals of the processor, one of the plurality of OISs 20 to be the target OIS.

In a possible implementation of this application, the control apparatus may further include a determining module.

Specifically, the determining module is configured to, in a case that two or more of the plurality of OISs 20 are detected to be in a working state, determine that the communication circuit is abnormal.

For the control apparatus provided in this embodiment of this application, reference may be made to the processes for performing the method shown in FIG. 5, and the units/modules of the apparatus and other operations and/or functions described above are respectively intended to implement the corresponding processes in the control method shown in FIG. 5, with the same or equivalent technical effects achieved. For brevity, details are not described herein again.

Optionally, an embodiment of this application further provides an electronic device including the communication circuit according to any one of the foregoing embodiments. To avoid repetition, details are not described herein again.

Optionally, an embodiment of this application further provides an electronic device including a processor 110, a memory 109, and a program or instructions stored in the memory 109 and capable of running on the processor 110, where when the program or instructions are executed by the processor 110, the processes of the foregoing embodiments of the control method are implemented, with the same technical effects achieved. To avoid repetition, details are not described herein again.

It should be noted that the electronic device in this embodiment of this application includes the foregoing mobile electronic devices and non-mobile electronic devices.

Figure 6:
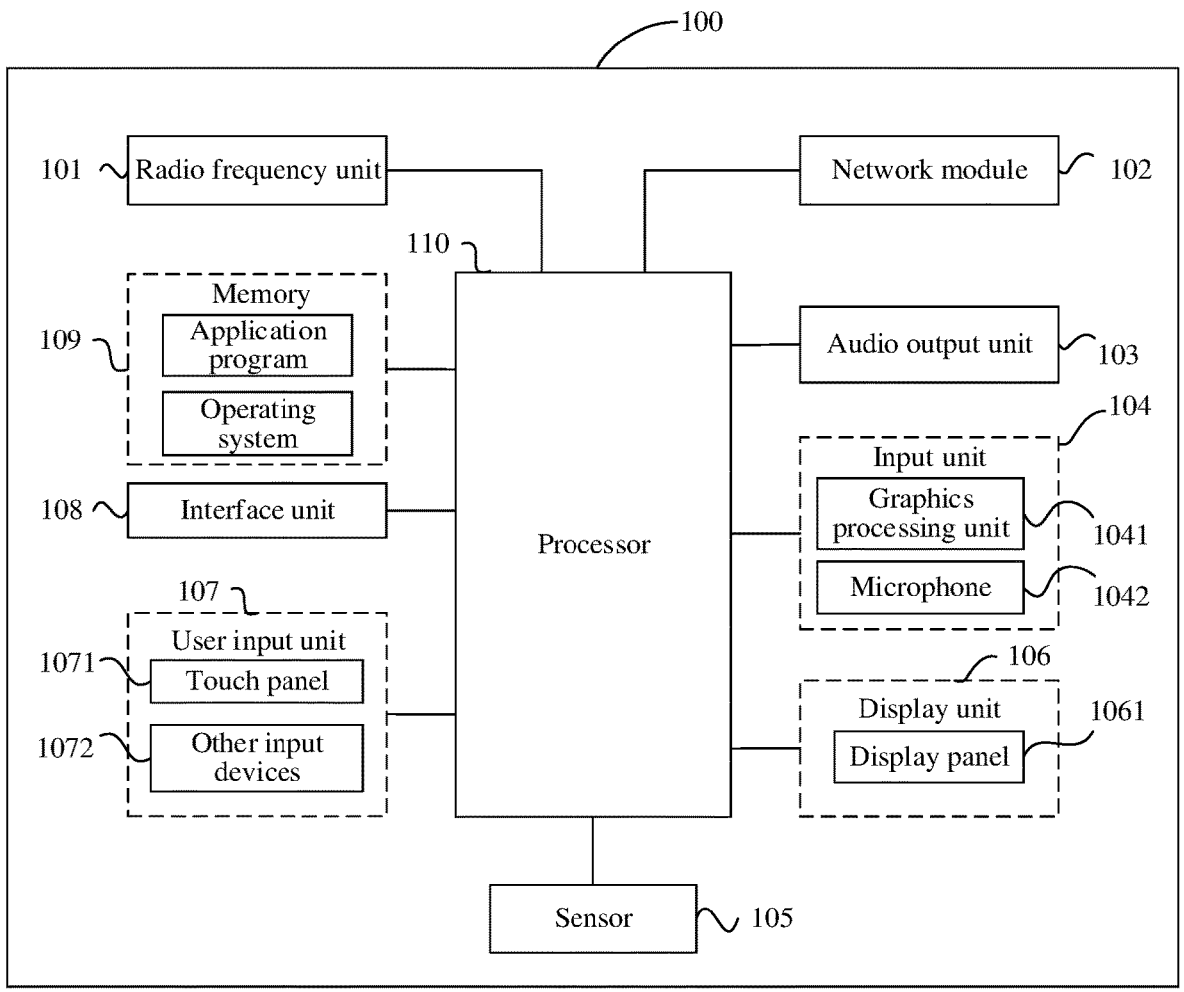
FIG. 6 is a schematic diagram of a hardware structure of an electronic device according to an embodiment of this application.

FIG. 6 is a schematic diagram of a hardware structure of an electronic device for implementing the embodiments of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111.

Persons skilled in the art can understand that the electronic device 100 may further include a power supply (for example, a battery) for supplying power to the components. The power supply may be logically connected to the processor 110 through a power management system. In this way, functions such as charge management, discharge management, and power consumption management are implemented by using the power management system. The structure of the electronic device shown in FIG. 6 does not constitute any limitation on the electronic device. The electronic device may include more or fewer components than shown in the figure, or combine some of the components, or arrange the components differently. Details are not described herein again.

The processor 110 is configured to: monitor states of a plurality of optical image stabilizers OIS; and in a case that only one target OIS in the plurality of OISs 20 is in a working state, control the target OIS to communicate with a gyroscope.

In this embodiment of this application, the states of the plurality of OISs 20 are detected, and in a case that only one target OIS in the plurality of OISs 20 is in a working state, the target OIS is controlled to communicate with the gyroscope. In this case, no collision occurs when the plurality of OISs 20 are connected to one gyroscope, and using only one gyroscope can reduce costs of the entire equipment.

Optionally, the processor 110 is further configured to determine the target OIS in the plurality of OISs 20 by determining a state of a control circuit connected to the plurality of OISs 20.

In this embodiment of this application, the control circuit is configured to control the OIS to conductively connect to the gyroscope, such that the state of the control circuit can be determined to quickly determine the target OIS.

Optionally, the processor 110 is further configured to control, using a power terminal of the exclusive NOR gate, the first MOS field effect transistor and/or the second MOS field effect transistor connected to the exclusive NOR gate to be conductively connected, where in a case that the first MOS field effect transistor is conductively connected, the first MOS field effect transistor is conductively connected to the first OIS, and the first OIS is the target OIS; and in a case that the second MOS field effect transistor is conductively connected, the second MOS field effect transistor is conductively connected to the second OIS, and the second OIS is the target OIS.

In this embodiment of this application, the OIS is controlled using hardware structures, namely, the exclusive NOR gate and the MOS field effect transistors, to be conductively connected, such that the plurality of OISs 20 cannot access one gyroscope at the same time, avoiding abnormal working of an SPI. The hardware structures are low-cost components, and using such structure can reduce costs of the entire equipment. In addition, the two OISs can be prevented from being conductively connected to the gyroscope at the same time. In other words, when the software is abnormal and the two OISs are powered on at the same time, the exclusive NOR gate outputs a high level, so as to turn off the two MOS field effect transistors, which can prevent the OISs from being conductively connected. Therefore, the OISs have good robustness.

Optionally, the processor 110 is further configured to sequentially control, according to a preset sequence using a plurality of control terminals of the processor, one of the plurality of OISs 20 to be the target OIS.

In this embodiment of this application, the plurality of OISs 20 may be controlled using the software, to work at different times, avoiding collision occurred in the SPI. In addition, no hardware component needs to be added, and therefore low costs are required.

Optionally, the processor 110 is further configured to: in a case that two or more of the plurality of OISs 20 are detected to be in a working state, determine that the communication circuit is abnormal.

In this embodiment of this application, the plurality of OISs 20 can be prevented from working at the same time. When the circuit is abnormal, working of all the OISs can be stopped, avoiding collision occurred in the SPI.

An embodiment of this application further provides a readable storage medium, where the readable storage medium stores a program or instructions, and when the program or instructions are executed by a processor, the processes of the foregoing embodiments of the control method are implemented, with the same technical effects achieved. To avoid repetition, details are not described herein again.

The processor is a processor in the electronic device in the foregoing embodiment. The readable storage medium includes a computer-readable storage medium such as a computer read-only memory (ROM), a random access memory (RAM), a magnetic disk, or an optical disc.

An embodiment of this application further provides a chip. The chip includes a processor and a communication interface, where the communication interface is coupled to the processor, and the processor is configured to run a program or instructions to implement the processes of the foregoing embodiments of the control method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In the absence of more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, and may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A communication circuit, comprising a plurality of optical image stabilizers (OIS), a gyroscope, and a control circuit; wherein an input terminal of the control circuit is connected to a power terminal, an output terminal of the control circuit is connected to the plurality of OISs separately, and the plurality of OISs are all connected to the gyroscope; and the control circuit controls one of the plurality of OISs to conductively connect to the gyroscope and establish a communication connection, wherein the plurality of OISs comprise a first OIS and a second OIS, and the control circuit comprises an exclusive NOR gate, a first metal oxide semiconductor (MOS) transistor, and a second MOS transistor; wherein a first input terminal of the exclusive NOR gate is connected to a first power terminal and a source of the first MOS transistor separately, a second input terminal of the exclusive NOR gate is connected to a second power terminal and a source of the second MOS transistor separately, and an output terminal of the exclusive NOR gate is connected to a gate of the first MOS transistor and a gate of the second MOS transistor separately;

a drain of the first MOS transistor is connected to a power input terminal of the first OIS;

a drain of the second MOS transistor is connected to a power input terminal of the second OIS; and the first OIS or the second OIS is controlled using an electrical signal input through two power terminals of the exclusive NOR gate, to conductively connect to the gyroscope.

2. The circuit according to claim 1, wherein the control circuit comprises a first control terminal and a plurality of MOS transistors, wherein
the first control terminal is connected to gates of the plurality of MOS transistors separately;
sources of the plurality of MOS transistors are all connected to their corresponding power terminals, and drains of the plurality of MOS transistors are all connected to their corresponding power input terminals of the OISs; and
one of the plurality of OISs is controlled using an electrical signal input through the plurality of power terminals and the first control terminal, to conductively connect to the gyroscope.

3. The circuit according to claim 1, wherein the control circuit is a processor, the processor comprises a plurality of control terminals connected to power input terminals of the plurality of OISs respectively, and one of the plurality of OISs is controlled using an electrical signal input through the plurality of control terminals, to conductively connect to the gyroscope.

4. The circuit according to claim 1, wherein the plurality of OISs each comprise an SPI interface, the gyroscope comprises an SPI interface, and the SPI interfaces of the plurality of OISs are all connected to the SPI interface of the gyroscope, wherein the OIS conductively connected to the gyroscope obtains, through a corresponding SPI interface, data detected by the gyroscope.

5. A control method, applied to the communication circuit according to claim 1, wherein the method comprises:
monitoring states of the plurality of OISs; and
in a case that only one target OIS in the plurality of OISs is in a working state, controlling the target OIS to communicate with the gyroscope.

6. The method according to claim 5, wherein the in a case that only one target OIS in the plurality of OISs is in the working state, controlling the target OIS to communicate with the gyroscope comprises:
determining the target OIS in the plurality of OISs by determining a state of a control circuit connected to the plurality of OISs.

7. The method according to claim 6, wherein the plurality of OISs comprise a first OIS and a second OIS, the control circuit comprises an exclusive NOR gate, a first MOS transistor, and a second MOS transistor, and the determining the target OIS in the plurality of OISs by determining a state of a control circuit connected to the plurality of OISs comprises:
controlling, using a power terminal of the exclusive NOR gate, the first MOS transistor and/or the second MOS transistor connected to the exclusive NOR gate to be conductively connected, wherein
in a case that the first MOS transistor is conductively connected, the first MOS transistor is conductively connected to the first OIS, and the first OIS is the target OIS; and in a case that the second MOS transistor is conductively connected, the second MOS transistor is conductively connected to the second OIS, and the second OIS is the target OIS.

8. The method according to claim 6, wherein the control circuit is a processor, and the determining the target OIS in the plurality of OISs by determining a state of a control circuit connected to the plurality of OISs comprises:

sequentially controlling, according to a preset sequence using a plurality of control terminals of the processor, one of the plurality of OISs to be the target OIS.

9. The method according to claim 5, wherein the method further comprises:
in a case that two or more of the plurality of OISs are detected to be in a working state, determining that the communication circuit is abnormal.

10. A control apparatus, applied to the communication circuit according to claim 1, comprising: a first processor, a memory, and a program or instructions stored in the memory and capable of running on the first processor, wherein when the program or instructions are executed by the first processor, the first processor is configured to:
monitor states of the plurality of OISs; and
in a case that only one target OIS in the plurality of OISs is in a working state, control the target OIS to communicate with the gyroscope.

11. The apparatus according to claim 10, wherein the first processor is further configured to:
determine the target OIS in the plurality of OISs by determining a state of a control circuit connected to the plurality of OISs.

12. The apparatus according to claim 11, wherein the plurality of OISs comprise a first OIS and a second OIS, the control circuit comprises an exclusive NOR gate, a first MOS transistor, and a second MOS transistor, and the first processor is configured to:
control, using a power terminal of the exclusive NOR gate, the first MOS transistor and/or the second MOS transistor connected to the exclusive NOR gate to be conductively connected; wherein
in a case that the first MOS transistor is conductively connected, the first MOS transistor is conductively connected to the first OIS, and the first OIS is the target OIS; and in a case that the second MOS transistor is conductively connected, the second MOS transistor is conductively connected to the second OIS, and the second OIS is the target OIS.

13. The apparatus according to claim 11, wherein the control circuit is a second processor, and the first processor is configured to:
sequentially control, according to a preset sequence using a plurality of control terminals of the second processor, one of the plurality of OISs to be the target OIS.

14. The apparatus according to claim 10, wherein the first processor is further configured to:
in a case that two or more of the plurality of OISs are detected to be in a working state, determine that the communication circuit is abnormal.

15. An electronic device, comprising the communication circuit according to claim 1.

16. A non-transitory readable storage medium, wherein the readable storage medium stores a program or instructions, and the program or instructions, when being executed by a processor, causes the processor to implement the steps of the method according to claim 6.

17. A communication circuit, comprising a plurality of optical image stabilizers (OIS), a gyroscope, and a control circuit; wherein
an input terminal of the control circuit is connected to a power terminal, an output terminal of the control circuit is connected to the plurality of OISs separately, and the plurality of OISs are all connected to the gyroscope; and the control circuit controls one of the plurality of OISs to conductively connect to the gyroscope and establish a communication connection, wherein the control circuit comprises a first control terminal and a plurality of MOS transistors, wherein the first control terminal is connected to gates of the plurality of MOS transistors separately;

sources of the plurality of MOS transistors are all connected to their corresponding power terminals, and drains of the plurality of MOS transistors are all connected to their corresponding power input terminals of the OISs; and one of the plurality of OISs is controlled using an electrical signal input through the plurality of power terminals and the first control terminal, to conductively connect to the gyroscope.

18. The communication circuit according to claim 17, wherein the control circuit is a processor, the processor comprises a plurality of control terminals connected to power input terminals of the plurality of OISs respectively, and one of the plurality of OISs is controlled using an electrical signal input through the plurality of control terminals, to conductively connect to the gyroscope.

19. The communication circuit according to claim 17, wherein the plurality of OISs each comprise an SPI interface, the gyroscope comprises an SPI interface, and the SPI interfaces of the plurality of OISs are all connected to the SPI interface of the gyroscope, wherein the OIS conductively connected to the gyroscope obtains, through a corresponding SPI interface, data detected by the gyroscope.

* * * * *